United States Patent [19]
Kaplan et al.

[11] 3,811,026
[45] May 14, 1974

[54] PROCESS FOR BENZOTHIEPINS
[75] Inventors: Jean-Pierre Kaplan, Allschwil; Emilio Kyburz, Reinach, both of Switzerland
[73] Assignee: Hoffmann-LaRoche Inc., Nutley, N.J.
[22] Filed: Apr. 20, 1972
[21] Appl. No.: 245,757

[30] Foreign Application Priority Data
May 4, 1971 Switzerland............... 6541/71
Feb. 28, 1972 Switzerland............... 2919/72

[52] U.S. Cl................ 260/268 TR, 260/327 B
[51] Int. Cl................................ C07d 51/70
[58] Field of Search............ 260/327 B, 268 TR

[56] References Cited
UNITED STATES PATENTS

| | | | |
|---|---|---|---|
| 3,351,599 | 11/1967 | Protiva | 260/268 TR |
| 3,379,729 | 4/1968 | Protiva | 260/268 TR |
| 3,600,391 | 8/1971 | Mastursi | 260/268 TR |
| 3,725,409 | 4/1973 | Protiva | 260/268 TR |
| 3,188,320 | 6/1965 | Sowinski et al. | 260/268 TR |
| 3,337,554 | 8/1967 | Jilev et al. | 260/268 TR |
| 3,347,849 | 10/1967 | Schmutz et al. | 260/268 TR |

FOREIGN PATENTS OR APPLICATIONS
476,016 9/1969 Switzerland............... 260/268 TR OTHER PUBLICATIONS
Gardiner et al., Can. J. Chem., Vol. 51, p. 1,419–1,421 (1973).
Shroff, Jour. Med. Chem., Vol. 8, p. 881–883 (1965).
Marshall et al., Jour. Org. Chem., Vol. 28, p. 421–423 (1963).
Gaylord, "Reduction With Complex Metal Hydrides," Interscience, 1956, p. 101 relied on.

*Primary Examiner*—Donald G. Daus
*Attorney, Agent, or Firm*—Samuel L. Welt; Bernard S. Leon; William G. Isgro

[57] ABSTRACT

A process for preparing 10-piperazinyl-10,11-dihydrodibenzo[b,f]thiepins by reducing the corresponding enamine with an alkali metal borohydride in the presence of a strong acid, is described.

11 Claims, No Drawings

PROCESS FOR BENZOTHIEPINS

BRIEF SUMMARY OF THE INVENTION

The invention relates to a process for preparing tricyclic compounds of the formula

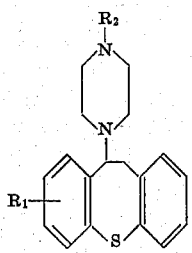

wherein $R_1$ is hydrogen, halogen, lower alkyl, perfluoro-lower alkyl, lower alkoxy, lower alkylthio, lower alkylsulfonyl or di-(lower alkyl)sulfamyl and $R_2$ is hydrogen, lower cycloalkyl, lower alkyl or lower alkyl substituted by hydroxy, phenyl, lower cycloalkyl or di-(lower alkyl)amino, or acid addition salts thereof, which comprises reducing the corresponding enamine with an alkali metal borohydride in the presence of a strong acid.

DETAILED DESCRIPTION OF THE INVENTION

The invention relates to a process for preparing tricyclic compounds of the formula

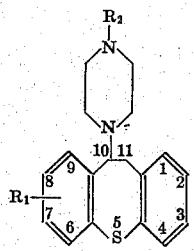

wherein $R_1$ is hydrogen, halogen, lower alkyl, perfluoro-lower alkyl, lower alkoxy, lower alkylthio, lower alkylsulfonyl or di(lower alkyl)sulfamyl and $R_2$ is hydrogen, lower cycloalkyl, lower alkyl or lower alkyl substituted by hydroxy, phenyl, lower cycloalkyl or di-(lower alkyl)amino, or acid addition salts thereof, which comprises reducing the corresponding enamine with an alkali metal borohydride in the presence of a strong acid.

As used herein, the term "lower alkyl" denotes a straight or branched chain saturated hydrocarbon containing from 1–7 carbon atoms, for example, methyl, ethyl, propyl, isopropyl, butyl, t-butyl, neopentyl, pentyl, heptyl, and the like. The term "lower alkoxy" denotes a lower alkyl ether group in which the lower alkyl group is as described above, for example, methoxy, ethoxy, propoxy, pentoxy, and the like. The term "lower alkylthio" denotes a lower alkylthio ether group in which the lower alkyl group is as described above, for example, methylthio, ethylthio and the like. The term "halogen" denotes bromine, chlorine or fluorine; preferred is chlorine. The term "lower cycloalkyl" denotes a saturated cyclic hydrocarbon containing 3–6 carbon atoms, for example, cyclopropyl, cyclopentyl or cyclohexyl. Of the perfluoro-lower alkyl, trifluoromethyl is preferred.

Preferred tricyclic compounds of formula I are those wherein $R_1$ is methyl or methoxy, or preferably, methylthio or chlorine, as well as those wherein $R_2$ is methyl or hydroxypropyl. An especially preferred tricyclic compound of formula I is 8-methylthio-10-(4-methylpiperazinyl)-10,11-dihydro-dibenzo[$b,f$]thiepin.

In accordance with the invention, the tricyclic compounds of formula I and their acid addition salts are prepared by reducing an enamine of the formula

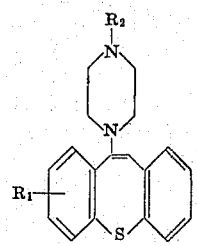

wherein $R_1$ and $R_2$ are as previously described, or an acid addition salt thereof, with an alkali metal borohydride in the presence of a strong acid and, where required, converting a base obtained into an acid addition salt.

The alkali metal borohydride utilized in the reduction of an enamine of formula II preferably is sodium borohydride or potassium borohydride; most preferably is sodium borohydride. Lithium borohydride can, however, also be used.

The strong acid in the presence of which the reduction is carried out can be either a strong organic acid or an inorganic acid. Exemplary of the organic acids are straight-chain or branched chain lower mono- or dicarboxylic acids of up to 4 carbon atoms, which may be substituted by halogen, such as formic acid, acetic acid, trichloroacetic acid, trifluoroacetic acid, propionic acid, isobutyric acid, oxalic acid or the like. Acetic acid and oxalic acid are preferred. Oxalic acid is most preferred. Especially suitable inorganic acids are, for example, sulfuric acid, perchloric acid, hydrohalic acids, such as hydrochloric acid or the like.

Since the salts of the enamine starting materials of formula II are unstable in the presence of water, it is expedient to carry out the reduction in the absence of water. Thus, only anhydrous acids or those acids in which water, if present, is not released, such as, for example, concentrated sulfuric acid, are utilized. The reduction is advantageously carried out in an inert solvent, for example, an ether such as diethyl ether, tetrahydrofuran, dioxan, diglyme or dimethoxyethane, and at a temperature in the range of about room temperature to the reflux temperature of the solvent. It is preferred to carry out the reduction under reflux conditions.

The invention also includes the manufacture of acid addition salts of the tricyclic compounds of formula I. Such salts comprise, for example, those formed with inorganic acids such as hydrochloric acid, hydrobromic acid and sulfuric acid or with organic acids such as oxalic acid, maleic acid, citric acid, acetic acid, lactic acid, tartaric acid, methanesulfonic acid or the like.

Non-pharmaceutically acceptable acid addition salts of the tricyclic compounds of formula I can be converted into pharmaceutically acceptable acid addition salts via conventional metathetic reactions whereby the non-pharmaceutically acceptable anion is replaced by a pharmaceutically acceptable anion; or alternatively, by converting the non-pharmaceutically acceptable acid addition salts into that free base and then reacting the latter with a reagent yielding a pharmaceutically acceptable anion.

In accordance with the present invention, the desired tricyclic compounds and their acid addition salts are synthesized in a simple manner and in high yields. For example, 8-methylthio-10-(4-methylpiperazinyl)-10,11-dihydro-dibenzo[b,f]thiepin can be prepared from the corresponding enamine in about 90 percent yield. Furthermore, this tricyclic compound is obtainable in over 80 percent yield based on the 8-methylthio-10,11-dihydro-dibenzo[b,f]thiepin-10-one used to prepare the corresponding enamine.

The tricyclic compounds of formula I and their pharmaceutically acceptable acid addition salts possess manifold action on the nervous system. Their central-depressing and neuroleptic actions are particularly pronounced and render them useful as agents for the treatment of acute and chronic psychosis. Accordingly, they can be utilized as medicaments in admixture with customary pharmaceutical carriers.

The starting materials, i.e., the enamines of formula II, can be prepared, for example, by reacting a ketone of the formula

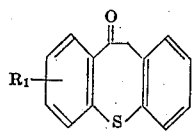

III wherein $R_1$ is as previously described, with a piperazine of the formula

IV wherein $R_2$ is as previously described.

The reaction of a ketone of formula III with a piperazine of formula IV is carried out in the presence of a strong acidic agent and in an inert aromatic solvent with heating, for example, to a temperature in the range of from about 80°C. to about 150°C. As the acidic agent, there can be used, for example, a mineral acid such as sulfuric acid, hydrochloric acid or the like, or a strong organic acid such as methanesulfonic acid, p-toluenesulfonic acid or the like. As the aromatic solvent, there can be used preferably benzene, toluene, o-, m- or p-xylene or the like. In the reaction, an azeotrope comprising the solvent and the water formed during the reaction is formed and can be removed by distillation. After work-up in the usual manner, for example, by washing with a basic agent, drying and evaporating, the residue yields the desired enamine of formula II. The latter can be recrystallized from an organic solvent, for example, a lower alkanol such as methanol, ethanol or the like.

The reaction of a ketone of formula III with a piperazine of formula IV can also be carried out so long as $R_2$ is not hydroxy-substituted lower alkyl, in the presence of a Lewis acid. As the Lewis acid, there can be used, for example, titanium tetrachloride, aluminum chloride, ferric chloride, boron trichloride, tin tetrachloride, zinc chloride, zirconium chloride or antimony trichloride. The reaction is preferably carried out at a temperature in the range of from about room temperature to the boiling point of the reaction mixture. Preferably, the mixture is heated to its boiling point. After cooling, the enamine of formula II is obtained from the mixture in the usual manner, for example, as described above.

The ketones of formula III are known compounds or can be prepared in an analogous manner to the known compounds.

The following examples further illustrate the process of the invention. All temperatures are in degrees centigrade, unless otherwise mentioned.

EXAMPLE 1

Preparation of 8-methylthio-10-(4-methylpiperazinyl)-10,11-dihydro-dibenzo[b,f]thiepin maleate.

175 ml. of glacial acetic acid are added dropwise over a period of 45 minutes at 20°–25°C. with stirring to a 4.5 liter four-necked flask equipped with a stirrer, condenser, thermometer and dropping funnel and containing a suspension of 83.0 g. of crude 8-methylthio-10-(4-methylpiperazinyl)-dibenzo[b,f]thiepin, 450 ml. of tetrahydrofuran and 26.0 g. of sodium borohydride. After the vigorous evolution of gas has abated, the mixture is stirred for an additional three hours under reflux conditions. The solvents are subsequently removed by distillation under reduced pressure. The residue is treated with 250 ml. of 2-N sodium hydroxide solution and 300 ml. of chloroform. Thereafter, the chloroform phase is washed once with 100 ml. of water. The two aqueous solutions are extracted with 100 ml. or 50 ml. of chloroform. The combined chloroform extracts are dried over sodium sulfate and concentrated under reduced pressure. The residue, 88.0 g., is treated with 460 ml. of ethanol, warmed to 35° C. and subsequently filtered. The filtrate is treated with 26.88 g. of maleic acid, heated under reflux conditions, treated with activated charcoal and filtered. The filtrate volume, 600 ml., is treated successively with five 300 ml. portions of ether. Subsequently, it is cooled for about 12 hours at about 0°C. The crystals obtained are removed by filtration and washed with a mixture of 250 ml. of ethanol/ether and lastly with ether whereby 88.34 g. of 8-methylthio-10-(4-methylpiperazinyl)-10,11-dihydro-dibenzo[b,f]thiepin maleate are obtained as white crystals having a melting point of 163.5°-165.5°C.

The 8-methylthio-10-(4-methylpiperazinyl)-dibenzo[b,f]-thiepin used as the starting material can be prepared as follows:

20.2 ml. of titanium tetrachloride in 150 ml. of absolute benzene are added dropwise, while gassing with nitrogen and stirring over a period of 25 minutes at 20°–25°C., to a 1.5 liter four-necked flask equipped with a stirrer, condenser and thermometer and containing a solution of 60.0 g. of 8-methylthio-10,11-dihydro-dibenzo[b,f]thiepin-10-one, 550 ml. of absolute benzene and 113.6 ml. of N-methylpiperazine. The dark-red suspension obtained is stirred for an additional 20 hours under reflux conditions. The solution is cooled to room temperature and poured into a stirred solution of 100 ml. of saturated sodium bicarbonate and 300 ml. of water. The fine precipitate obtained, which consists of titanium dioxide, is removed by filtration. The filter cake is washed with 200 ml. of benzene and 200 ml. of chloroform. The benzene phase is washed with 200 ml. and 150 ml. of water and the aqueous solutions are reextracted with chloroform filtrate. The combined organic phases are dried over sodium sulfate and concentrated under reduced pressure whereby there are obtained 83.0 g. of crude light brown-colored 8-methylthio-10-(4-methylpiperazinyl)-dibenzo[b,f]thiepin which melts at 142.5°–146°C. This crude product can be employed in the process without further purification. If desired, it can be purified in the following manner:

83.0 g. of 8-methylthio-10-(4-methylpiperazinyl)-dibenzo [b,f]thiepin are heated in about 300 ml. of ethanol under reflux conditions. The suspension is cooled and filtered whereby there are obtained about 86 percent with a melting point of 148.5°C.–150.5°C. and about 6 percent with a melting point of 142°C.–145°C.

EXAMPLE 2

Preparation of 8-methylthio-10-(4-methylpiperazinyl)-10,11-dihydro-dibenzo[b,f]thiepin maleate.

A suspension of 6.0 g. of 8-methylthio-10-(4-methylpiperazinyl)-dibenzo[b,f]thiepin in 50 ml. of absolute tetrahydrofuran is treated with 3.0 g. of sodium borohydride. The mixture is treated over a period of 30 minutes with 20 ml. of acetic acid, the temperature being maintained at 20°–27°C. After the abatement of the vigorous evolution of gas (hydrogen), the mixture is heated for one hour under reflux conditions. Then the mixture is cooled to 60°C. and treated with 15 ml. of methanol. After the abatement of the evolution of gas, the mixture is once again heated for 30 minutes under reflux conditions. The solvent is evaporated under reduced pressure and the residue partitioned between chloroform and 2-N aqueous sodium hydroxide solution. The chloroform phase is washed with water, dried and evaporated. The oily residue is treated with 50 ml. of ethanol and 2.09 g. of maleic acid. After filtration, 120 ml. of ether are added and the mixture is allowed to stand overnight at 5°C. The crystals formed are washed with a cold mixture of ethanol/ether and subsequently with ether and evaporated under reduced pressure whereby 7.28 g. of 8-methylthio-10-(4-methylpiperazinyl)-10,11-dihydro-dibenzo [b,f]thiepin maleate are obtained as white crystals which melt at 166.5°–168°C. Yield 91 percent.

The 8-methylthio-10-(4-methylpiperazinyl)-dibenzo[b,f]thiepin used as the starting material can be prepared as follows:

A solution of 15.0 g. of 8-methylthio-10,11-dihydro-dibenzo [b,f]thiepin-10-one and 25.1 g. of N-methylpiperazine in 275 ml. of benzene is treated, over a period of 10 minutes, with stirring and gassing with nitrogen, with a solution of 5 ml. of titanium tetrachloride in 55 ml. of benzene, the temperature being maintained between 18°C. and 22°C. The mixture is stirred for 24 hours and subsequently poured into an aqueous sodium hydroxide solution. The suspension formed is removed by filtration and the precipitate washed with some benzene. The organic phase is washed with water, dried over sodium sulfate and evaporated. The residue, about 20.5 g., is heated with 80 ml. of ethanol under reflux conditions, cooled and filtered. After evaporation of the solvent under reduced pressure, 17.9 g. (91.7 percent) of 8-methylthio-10-(4-methylpiperazinyl)-dibenzo[b,f]thiepin are obtained as a yellow product which melts at 149.5°–151°C.

EXAMPLE 3

Preparation of 10,11-dihydro-8-methyl-10-(4-methylpiperazinyl)-dibenzo[b,f]thiepin.

16 g. of 8-methyl-10-(4-methylpiperazinyl)-dibenzo[b,f]thiepin, 90 ml. of absolute tetrahydrofuran, 5 g. of sodium borohydride and 37 ml. of glacial acetic acid are reacted in an analogous manner to that described in Example 1. After working up in benzene, there are obtained 16.5 g. of 10,11-dihydro-8-methyl-10-(4-methylpiperazinyl)-dibenzo[b,f]thiepin as a yellow oil. The yellow oil is dissolved in 85 ml. of alcohol and treated with a solution of 5.75 g. of maleic acid in 30 ml. of alcohol. The maleate crystallizes after the addition of 100 ml. of ether and cooling to 0°C. whereby 17.1 g. (78 percent yield) of the maleate salt having a melting point of 161°–163°C. are obtained.

The 8-methyl-10-(4-methylpiperazinyl)-dibenzo[b,f]thiepin used as the starting material can be prepared from 10,11-dihydro-8-methyl-dibenzo[b,f]-thiepin-10-one and N-methylpiperazine in an analogous manner to that described in Example 1.

EXAMPLE 4

Preparation of 10,11-dihydro-10-(4-methylpiperazinyl)-dibenzo[b,f]thiepin.

14 g. of 10-(4-methylpiperazinyl)-dibenzo[b,f]thiepin, 90 ml. of absolute tetrahyfrofuran, 4.94 g. of sodium borohydride and 32 ml. of glacial acetic acid are reacted in an analogous manner to that described in Example 1. After working up in benzene, there are obtained 13.45 g. of 10,11-dihydro-10-(4-methylpiperazinyl)-dibenzo[b,f]thiepin of melting point 128°–132°C. This base is dissolved in 80 ml. of alcohol, filtered and treated with 4.88 g. of maleic acid in 25 ml. of alcohol. The maleate crystallizes after the addition of 100 ml. of ether and cooling to 0°C. whereby there are obtained 14 g. (73 percent yield) of the maleate having a melting point of 139°–141°C.

The 10-(4-methylpiperazinyl)-dibenzo[b,f]thiepin used as the starting material can be prepared from 10,11-dihydro-dibenzo [b,f]thiepin-10-one and N-methylpiperazine in an analogous manner to that described in Example 1.

EXAMPLE 5

Preparation of 10,11-dihydro-8-chloro-10-(4-methylpiperazinyl)-dibenzo[b,f]thiepin.

2.5 g. of 8-chloro-10-(4-methylpiperazinyl)-dibenzo[b,f]thiepin are dissolved in 150 ml. of diglyme and treated with 2 g. of sodium borohydride. A solution of 10 g. of oxalic acid in 40 ml. of diglyme is allowed to drop into the mixture over a period of 20 minutes and then the resulting mixture is heated to 100°C. for 2 hours. The solvent is subsequently evaporated under reduced pressure. The residue is treated with 150 ml. of 2-N sodium hydroxide solution and extracted with three 100 ml. portions of benzene. The combined benzene solutions are washed with water, dried over magnesium sulfate and evaporated whereby 2.6 g., of 10,11-dihydro-8-chloro-10-(4-methylpiperazinyl)-dibenzo[b,f]thiepin are obtained as a yellow oil. The oil is dissolved in 20 ml. of alcohol and treated with 0.91 g. of maleic acid in 10 ml. of alcohol and 30 ml. of ether whereby 2.6 g. (78 percent yield) of the maleate of melting point 199°–200°C. are obtained.

The 8-chloro-10-(4-methylpiperazinyl)-dibenzo[b,f]thiepin used as the starting material can be prepared from 8-chloro-10,11-dihydro-dibenzo[b,f]-thiepin-10-one and N-methylpiperazine in an analogous manner to that described in Example 1.

EXAMPLE 6

Preparation of 10,11-dihydro-8-methylthio-10-(4-hydroxy-propylpiperazinyl)-dibenzo[b,f]thiepin.

In an analogous manner to that described in Example 5, from 1.6 g. of 8-methylthio-10-(4-hydroxypropylpiperazinyl)-dibenzo[b,f]thiepin in 90 ml. of diglyme and 1.28 g. of sodium borohydride there are obtained, after the addition of 0.4 g. of oxalic acid in 25 ml. of diglyme and heating to 100°C. for 4 hours, 1.8 g. of 10,11-dihydro-8-methylthio-10-(4-hydroxy-propylpiperazinyl)-dibenzo[b,f]thiepin in the form of an oil. The oil is dissolved in 20 ml. of acetone and treated with 9.4 ml. of 5 percent maleic acid in acetone and 20 ml. of ether whereby there are obtained 1.1 g. of the maleate having a melting point of 117°–120°C.

EXAMPLE 7

Preparation of 10,11-dihydro-8-chloro-10-(4-methylpiperazinyl)-dibenzo[b,f]thiepin.

2.5 g. of 8-chloro-10-(4-methylpiperazinyl)-dibenzo[b,f]thiepin are dissolved in 100 ml. of diglyme and treated with 2 g. of sodium borohydride. Subsequently, 3.1 ml. of concentrated sulfuric acid ($d = 1.84$) are added dropwise to the solution at 10°–20°C. and the resulting mixture is stirred at 100°C. for 4 hours. For the working-up, the solvent is evaporated under vacuum. The residue is treated with 100 ml. of 2-N sodium hydroxide solution and 50 ml. of water and then extracted three times with benzene. The combined benzene extracts are washed with water, dried over magnesium sulfate, filtered and evaporated whereby there are obtained 2.5 g. of 10,11-dihydro-8-chloro-10-(4-methylpiperazinyl)-dibenzo[b,f]thiepin in the form of an oil. The oil is dissolved in 40 ml. of acetone, treated with 14 ml. of a 5 percent maleic acid solution and 20 ml. of ether whereby there are obtained 2.4 g. of the maleate having a melting point of 195°C.

We claim:

1. A process for the preparation of a tricyclic compound of the formula

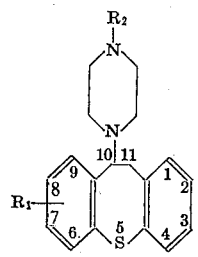

wherein $R_1$ is hydrogen, halogen, lower alkyl of 1 to 7 carbon atoms, trifluoromethyl, lower alkoxy of 1 to 7 carbon atoms, lower alkylthio of 1 to 7 carbon atoms, lower alkylsulfonyl of 1 to 7 carbon atoms or di-(lower alkyl of 1 to 7 carbon atoms)sulfamyl and $R_2$ is hydrogen, lower cycloalkyl of 3 to 6 carbon atoms, lower alkyl of 1 to 7 carbon atoms or lower alkyl of 1 to 7 carbon atoms substituted by hydroxy, phenyl, lower cycloalkyl of 3 to 6 carbon atoms or di-(lower alkyl of 1 to 7 carbon atoms)amino, or acid addition salts thereof, which comprises the step of reducing an enamine of the formula

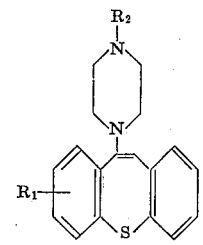

wherein $R_1$ and $R_2$ are as described above, or an acid addition salt thereof, with an alkali metal borohydride in the presence of a strong acid selected from the group consisting of unsubstituted and halo-substituted straight chain lower mono- or dicarboxylic acids of up to 4 carbon atoms, unsubstituted and halo-substituted branched chain lower mono- or dicarboxylic acids of up to 4 carbon atoms, hydrohalic acids, sulfuric acid and perchloric acid.

2. A process in accordance with claim 1, wherein the strong acid is a lower mono- or dicarboxylic acid of up to 4 carbon atoms.

3. A process in accordance with claim 2, wherein the alkali metal borohydride is sodium borohydride.

4. A process in accordance with claim 3, wherein the carboxylic acid is acetic acid.

5. A process in accordance with claim 3, wherein the carboxylic acid is oxalic acid.

6. A process in accordance with claim 1, wherein the strong acid is sulfuric acid, perchloric acid or hydrohalic acid.

7. A process in accordance with claim 1, wherein tetrahydrofuran or diglyme is used as a solvent.

8. A process in accordance with claim 1, wherein $R_1$ in the enamine of formula II is present in the 8-position is used.

9. A process in accordance with claim 8, wherein $R_1$ is methylthio.

10. A process in accordance with claim 8, wherein $R_1$ is chlorine.

11. A process in accordance with claim 9, wherein $R_2$ is methyl.

* * * * *